Feb. 20, 1923.
L. N. MOWRY ET AL.
SALT SHAKER.
FILED OCT. 5, 1922.
1,446,101.
2 SHEETS—SHEET 1.
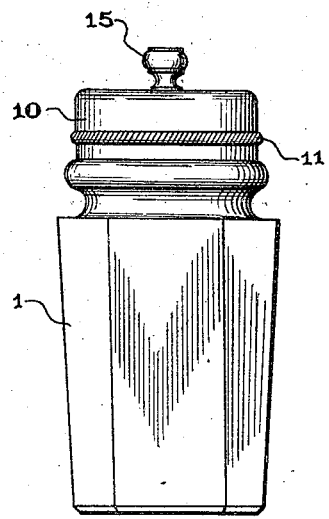
Fig.1.
Fig.2.
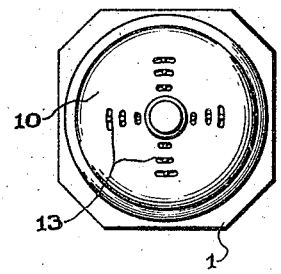
Fig.3.
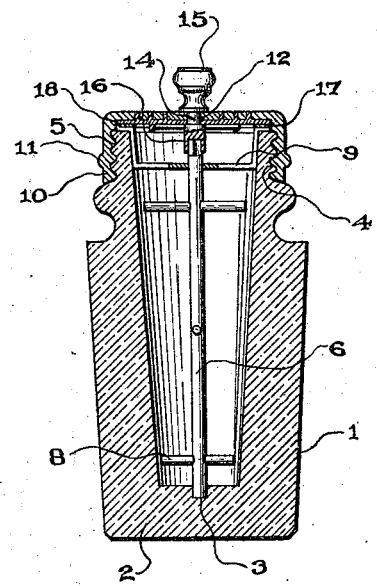
Inventors
Lloyd N. Mowry
Edward Lovig
By Clarence A. O'Brien
Attorney
H. Berman
H. A. LaClair
Witnesses Feb. 20, 1923.
L. N. MOWRY ET AL.
SALT SHAKER.
FILED OCT. 5, 1922.
1,446,101.
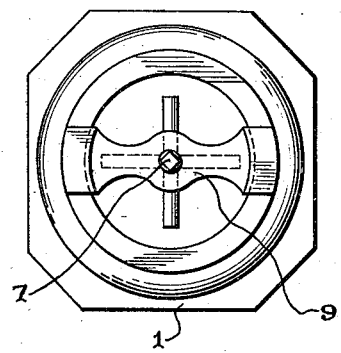
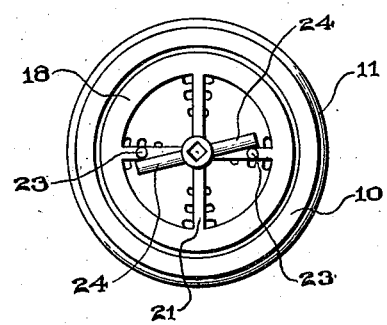
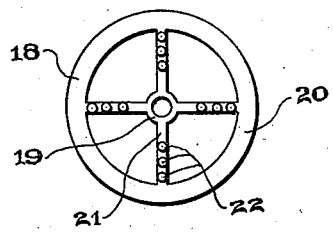
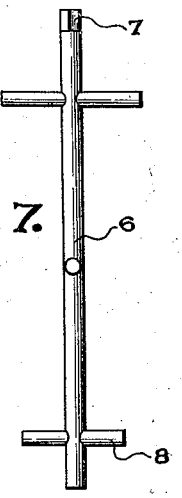
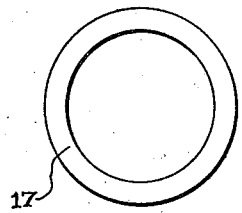
Inventors
Lloyd N. Mowry
Edward Lovig
By Clarence A. O'Brien
Attorney Patented Feb. 20, 1923.

1,446,101

UNITED STATES PATENT OFFICE.

LLOYD N. MOWRY AND EDWARD LOVIG, OF ST. PETERSBURG, FLORIDA.

SALT SHAKER.

Application filed October 5, 1922. Serial No. 592,468.

*To all whom it may concern:*

Be it known that we, LLOYD N. MOWRY and EDWARD LOVIG, citizens of the United States, residing at St. Petersburg, in the county of Pinellas and State of Florida, have invented new and useful Improvements in Salt Shakers, of which the following is a specification.

The object of our said joint invention is the provision of a simple easily-operated and readily cleaned salt shaker constructed in such manner that the user is enabled to expeditiously and thoroughly in one operation break up lumps and mix or agitate the salt, cut salt crust from the underside of the shaker top and clear the eduction apertures in the top, thereby assuring free passage of salt from the inverted shaker under all conditions.

To the attainment of the foregoing the invention consists in the improvement as hereinafter described and definitely claimed.

In the accompanying drawings, forming part of this specification:—

Figure 1 is a side elevation of the shaker constituting the best practical embodiment of our invention that we have as yet devised.

Figure 2 is a diametrical section of the same with some parts in elevation.

Figure 3 is a top plan view of the shaker.

Figure 4 is a top plan view of the body of the shaker and the parts therein as the same appear when the top is removed from the body.

Figure 5 is an enlarged inverted plan view showing the top and the parts carried by the same.

Figure 6 is an enlarged top plan view of the turn disk carried in and movable relative to the shaker top.

Figure 7 is an enlarged elevation of the mixing or lump breaking shaft per se.

Figure 8 is an enlarged plan view of the disk-retaining ring of the cover.

Similar numerals of reference designate corresponding parts in all of the views of the drawings.

In furtherance of our invention the shaker body 1, of glass or other appropriate material, is provided in the upper side of its bottom wall 2 with a central socket bearing 3. The neck 4 on the said body is by preference exteriorly threaded at 5, and the inner side of the side wall of the body is preferably smooth as shown.

Removably arranged in the body 1 and journaled at its lower end in the socket bearing 3 is the salt mixing shaft 6 of the improvement, the said shaft being of angular form in cross-section at its upper end, as designated by 7, and being provided with lateral arms 8. The upper portion of the said shaft 6 is journaled in a cross-bar 9, Figures 2 and 4, which is shaped as shown to rest tightly though removably in and on the upper portion of the body 1. The said top is knurled at 11 to facilitate turning thereof about its axis and is provided with a central circular aperture 12 and with elongated salt eduction apertures 13. A shaft 14 is journaled in the top aperture 12 and is provided at its upper end with a finger piece 15 and at its lower end with a socket 16 of angular form in cross-section, the latter for detachable engagement with the angular end 7 of shaft 6. At 17, Figures 2 and 8, is a metallic ring, the outer edge of which is soldered or otherwise appropriately fixed to the preferably metallic top 10, and at 19, Figures 2, 5 and 6, is the preferably-metallic turn disk of the shaker, which is interposed between and retained in working position by the ring 17 and the top as shown in Figure 2. The said disk includes a central apertured or hub portion 19 which receives and is adapted to turn about the shaft, a rim 20 and spokes 21, the latter being equipped at their upper sides with pins 22 movable laterally in the before mentioned elongated apertures 13. At their undersides two of the said spokes 21 are provided with pendent lugs 23, best shown in Figure 5. These lugs 23 are opposed to oppositely-directed arms 24 on the socket portion 16 of the shaft 14, Figures 2 and 5.

Manifestly the cover 10 and the parts carried thereby are readily separable as a unit from the body 1 and the shaft 6, as when the body 1 is to be filled with salt or the shaker is to be cleaned; also, the bar 9 and the shaft 6 are preferably removable from the body 1 to facilitate thorough cleaning of the shaker.

In the use of the shaker it will be apparent that turning of the finger piece 15 first in one direction and then in the other will be attended by rocking of the shaft 6 about its axis and comparatively long movements of the arms 8 for the purpose indicated while near the end of each turn of the finger piece 15 the arms 24 will cooperate with the lugs 23 to turn the disk 18 and move the pins 22 in the elongated openings or slots 13, thereby clearing the said slots. Incident to the described turning of the disk 18, the spokes 21 will work against the underside of the top 10 and remove salt crust from the same with the result that salt will pass freely through the slots 13 when the shaker is inverted.

We have entered into a detailed description of the construction and relative arrangement of the parts embraced in the present and preferred embodiment of the invention in order to impart a full, clear and exact understanding of the said embodiment. We do not desire, however, to be understood as confining ourselves to the specific construction and relative arrangement of parts inasmuch as in the future practice of the invention various changes and modifications may be made such as fall within the scope of our invention as defined in our appended claims.

Having described our invention, what we claim and desire to secure by Letters Patent, is:—

1. In a salt shaker, an agitator moved therein, a top for the shaker having salt eduction slots therein, pins carried by a turn device and extending through said slots, means for moving said agitator, and arms carried by said means for engaging pendent pins upon the turn device for moving said first mentioned pins within the slots simultaneously with the moving of said agitator.

2. A salt shaker top having salt-eduction slots, in combination with pins extending through and movable in said slots in the direction of the length thereof, and a movable finger piece carried by and arranged exteriorly of the top and connected with said pins, whereby movement of the pins relative to the top will attend movement of the finger-piece relative to the top; the said pins being carried in series by and extending outwardly from a bar, and the said bar being arranged to sweep against the inner side of the top.

3. A salt shaker top having salt-eduction slots, in combination with pins extending through and movable in said slots in the direction of the length thereof, and a movable finger piece carried by and arranged exteriorly of the top and connected with said pins, whereby movement of the pins relative to the top will attend movement of the finger-piece relative to the top; the said connection including a turn device at the inner side of the top and having spaced bars arranged to sweep against the inner side of the top and by each of which a series of the pins is carried.

4. A salt shaker top having salt-eduction slots, in combination with pins extending through and movable in said slots in the direction of the length thereof, and a movable finger piece carried by and arranged exteriorly of the top and connected with said pins, whereby movement of the pins relative to the top will attend movement of the finger-piece relative to the top; the said connection including a turn device at the inner side of the top and having spaced bars arranged to sweep against the inner side of the top and by each of which a series of the pins is carried, and a retaining ring secured to the top and between which and the periphery of the turn device is retained and movable.

5. A salt shaker top having salt-eduction slots, in combination with pins extending through and movable in said slots in the direction of the length thereof, and a movable finger piece carried by and arranged exteriorly of the top and connected with said pins, whereby movement of the pins relative to the top will attend movement of the finger-piece relative to the top; the said connection including a turn device at the inner side of the top and having spaced bars arranged to sweep against the inner side of the top and by each of which a series of the pins is carried, and also including a shaft with an angular socket at its lower end, pendent lugs on the turn device, and arms on the shaft and arranged to bring up against the lugs, and the whole being associated with a body to which the top is detachably connected, and an agitator rotatable in the body and having an angular end detachably arranged in the said socket.

In testimony whereof, we affix our signatures.

LLOYD N. MOWRY.
EDWARD LOVIG.